3,687,642
PROCESS FOR PREPARING CHLORO-POLYSILOXANES

Gotz Koerner, 126 Kantorie, 43 Essen, Germany, and Gerd Rossmy, 27 Barkhorstrucken, 43 Essen-Werden, Germany
No Drawing. Filed May 19, 1971, Ser. No. 145,047
Int. Cl. C01b 33/00, 33/20; C07f 7/08
U.S. Cl. 423—342                                   8 Claims

ABSTRACT OF THE DISCLOSURE

Process of preparing compounds of the general formula

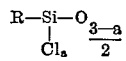

wherein $a=0.5$ to 1.1 and R is hydrogen, chlorine, alkyl or aryl, by subjecting silanes of the general formula $RSiCl_3$ to hydrolysis with tertiary alcohols as hydrolyzing agents. The tertiary alcohol is added in dropwise manner to the silanes at temperatures between about 10° C.–150° C., preferably in the presence of an inert solvent. Less than 0.9 mole of tertiary alcohol per mole of silane are used. Unreacted silane as well as t-alkylchloride, which is formed as by-product, and the solvent are removed by distillation. The compounds are hydrophobing agents for a variety of purposes and starting materials for hardeners of silicone rubbers.

The process results in the formation of novel compounds of the formula
and

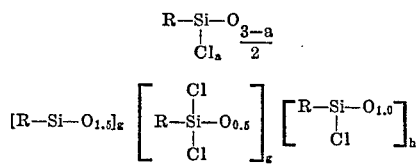

having an average mole weight of 600–2000 wherein $a=0.5$–0.9, $g$ is greater than $h$, $g$ and $h$ are greater than zero, and R is hydrogen, chlorine, alkyl or aryl.

FIELD OF INVENTION

The invention relates to a process for preparing compounds of the general formula

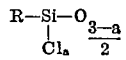

wherein $a=0.5$–1.1 and R is hydrogen, chlorine, alkyl or aryl. The alkyl or aryl may be substituted; the compounds are made by hydrolysis of silanes of the general formula $RSiCl_3$ with tertiary alcohols as hydrolysis agents.

In the formula, R may be e.g. methyl, ethyl, propyl butyl or phenyl. The alkyl and aryl groups may, if desired, be inert, i.e. they may be substituted by groups which are free of acidic H atoms.

BACKGROUND INFORMATION AND PRIOR ART

The hydrolysis of halogen-silanes with tertiary alcohols, especially t-butyl alcohol, has been known for a long time; it is, for instance, described in W. Noll "Chemie und Technologie der Silicone" 2nd edition, 1968, page 173. t-Alkylchloride, e.g. t-butylchloride, is formed as a by-product of the reaction.

German Auslegeschrift 1,807,410 discloses a process for preparing halogen siloxanes of the formula

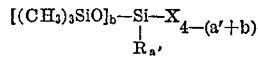

wherein R is hydrogen, alkyl or aryl, preferably methyl or phenyl, X is chlorine or bromine, $a'=0$ or 1, and $b=1$, 2 or 3, and $(a'+b)=2$ or 3, preferably 3. This process is characterized by the dropwise addition of about $b$ moles of tertiary alcohols to a mixture of one mole silane of the formula $R_{a'}SiX_{4-a'}$ and $2b$ to $5b$ moles silanes of the formula $(CH_3)_3SiX$, at temperatures below 40° C., if desired with simultaneous passage of HX.

The silane reaction mixture contains large amounts of silanes of the formula $(CH_3)_3SiX$, to wit of monofunctional silane. In this manner it is prevented from the very outset that hydrolysis of the silanes of the formula $R_{a'}SiX_{4-a'}$, present in the silane mixture, results in the formation of gel-like hydrolysis products.

The hydrolysis of chlorosilanes of higher functionality, particularly of tri- and tetrafunctional chlorosilanes, or of mixtures containing such silanes, presents a very serious problem. The formation of gel-like reaction products is then always a danger.

SUMMARY OF INVENTION

It is therefore a primary object of the present invention to provide a process of preparing chloropolysiloxanes in which such gel formation is positively avoided.

It is also an object to provide novel compounds useful as hydrophobing agents, e.g. for leather, textiles and the like and protective coatings for buildings, as well as starting materials for hardeners for silicone rubbers.

Other objects and advantages of the invention will become apparent from the detailed description below.

It has surprisingly been found that by the use of tertiary alcohols and special reaction conditions, trifunctional halogen silanes can be hydrolysed to well-defined liquid or liquefiable chloropolysiloxanes without the undesirable gel formation taking place.

The process of the invention is characterized by first introducing the silanes into a reaction vessel and adding the tertiary alcohol dropwise at temperatures between 10 and 150° C., if desired in the presence of an inert solvent, the amount of tertiary alcohol per mole of silane being less than 0.9 mole preferably 0.5–0.125 mole, and distilling off the unreacted silane with the t-alkylchloride formed as by-product and the solvent, if used.

As tertiary alcohol it is preferred to use one with 4–8 C atoms, particularly t-butanol.

The process according to the invention may be illustrated by the following reaction mechanism:

$$cRSiCl_3 + t\text{-}R'OH$$

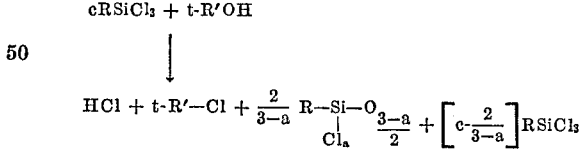

wherein $c=1.1$–8
$R'=\text{t-alkyl with 4–8 C atoms}$
$a=0.5$–1.1
$R=H$, Cl, or alkyl or aryl which may, if desired be substituted. In the reaction, new compounds are formed having the general formula

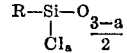

with a mean moleweight of 600–2000, wherein R and $a$ have the above indicated meaning.

The above formula indicates the average composition of the reaction product. The amount of individual species depends on the reaction parameters, especially on the temperature and the ratio of silane to tertiary alcohol in the reaction. In the hydrolysis at room temperature, siloxanes are formed, primarily, with $a$ being less than 1, mostly between 0.5 and 0.9. These siloxanes correspond to the formula

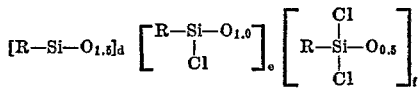

wherein $d > e$ and $f$, and $d$, $e$, $f \neq 0$.

These siloxanes are not in equilibrium as far as the polymer distribution is concerned. Upon addition of a slight amount of an acidic equilibration catalyst, such as sulfuric acid, a gel is formed immediately.

Contrary to this hydrolysis at room temperature, when reflux temperature is applied, or, when the boiling point of the silanes to be hydrolysed lies above 100° C., when working at 100° C., siloxanes will be formed in which the value $a$ will be quite close to 1, if the use of inert solvents is avoided. The structure of these products was established by NMR spectroscopy. This showed that these siloxanes correspond to the formula

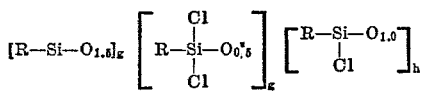

with $g, h \neq 0$ and
$g > h$

These are cyclic siloxanes, which explains that the ratio Cl:Si, that is to say, the value $a$ is approximately 1.

The mole ratio of silane:tertiary alcohol is likewise important for the compositions of the reaction product. In general, the value $a$ decreases with increasing amounts of the tertiary alcohol. In a certain mole ratio, a range is reached in which gel-like residues are formed. This gel forming limit value lies, for instance, in the reflux temperature hydrolysis of methyltrichlorosilane between 0.5 and 0.66 mole of t-butanol per mole of silane. However, the limit value for gel formation may be extended by the use of an inert solvent, e.g. carbontetrachloride, to a range in which the process may still be carried out within the limits defined in the claims. Inert solvents are for this purpose such solvents which do not react with chlorosilane and which do not belong among Lewis bases such as ether or tertiary amines.

Whereas the hydrolysis products of methylchlorosilane are liquid, those of phenyltrichlorosilane are solid. However, the latter are soluble in inert solvents and they are liquid at elevated temperature, e.g. 200° C., therefore, they are no gels. In the hydrolysis of hydrogentrichlorosilane it is surprising that the hydrogen bound to silicon remains intact although it is sensitive to hydrolysis. In some cases, e.g. in the reflux hydrolysis of SiCl$_4$, the yield in non-volatile chlorosiloxanes is comparatively small, if distillation is carried out at the bridge. In such cases the use of a distillation column is advisable.

The compounds made according to the invention in which R=CH$_3$ or long-chain alkyl with 12–18 C atoms, are excellent hydrophobing agents, particularly for surfaces of silicates. The chlorine atoms then react with surface bound hydroxyl groups or with adsorptively bound water. This property renders the compounds according to the invention useful as protective agents for building structures. They are furthermore excellently adapted for hydrophobing other materials, such as leather, textiles and the like.

Another application is the use of the compounds as starting materials for the production of hardeners for silicone rubbers hardening at room temperature with admission of atmospheric humidity, the Cl-atoms of the compounds of the invention being then exchanged for acetoxy-, alkylamino, amido- or oxim groups.

The compounds according to the invention form, when undergoing hydrolysis condensation, brittle silsesquioxanes. However, when the inventive compounds are used as building blocks for the preparation of mixed polymers, more or less elastic, impact-resistant polymers will be formed depending on the kind of said mixed polymers, when they are subjected to hydrolysis condensation. Particularly interesting are in this connection such mixed polymers which contain as organic building block lightly cross-linked pre-polymers or prepolymers without cross-linkage, e.g. linear polyesters of aliphatic or hydroaromatic dicarboxylic acids with terminal C—OH-groups which react with the SiCl-groups of the compounds of the invention by SiOC-linking. Of course, in this reaction only a small number of the SiCl-groups should take part, whereas the remaining ones are cross-linked in the subsequent hydrolysis condensation. Instead of the organic pre-polymers organic silicon compounds may be used, e.g. α, ω-dihydroxypolydimethylsiloxane.

The process of the invention and the properties of the novel compounds made shall now be described more fully in a number of examples which are given by way of illustration but not of limitation. Many changes in the details can be made without departing from the spirit of the invention.

Example 1

A three-necked flask is first charged with 598 g. (4 mols) of methyltrichlorosilane, to which 74.1 g. (1 mol) of t-butanol are added drop by drop within 3 hours at room temperature, while stirring. Stirring is then continued for two more hours at room temperature and for another hour at reflux temperature. The product is then subjected to distillation with use of a distillation device without a column at a bath temperature of 210° C. at normal pressure, whereby volatile substances are eliminated. The residue totalling 70.3 corresponds to the formula

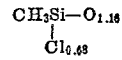

determined by the hydrolytically found Cl-value.

The values found by means of elementary analysis conform well with the above. Percentages are given by weight.

Theoretically calc. (percent): Si, 32.7; C, 14.0; H, 3.5.
Found (percent): Si, 32.2; C, 13.8; H, 3.5.

The yield in hydrolysate, calculated on t-butanol used as hydrolyzing agent, was 95%. The viscosity of the product was 192 cp. (20° C.). The mole weight was 1200 determined kryoscopically. In the infrared range the product has a wide band at 1026 cm.$^{-1}$. This band corresponds ot a SiOSi-stretching vibration of a strained cyclic siloxane. Bands which could indicate a content in t-C$_4$H$_9$O—Si-groups were not observed in the infrared spectrum. In the NMR-spectrum, taken with a Varian[1] unit A 100, 3 peaks were obtained at 9.74τ, 9.46τ and 9.17τ (peak for tetramethylsilane=10τ). The peaks were in an area ratio 113:36:50. They belong to the groupings.

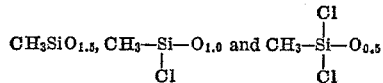

Corresponding to the first formula shown in col. 3, the ratio $d:e:f$=113:36:50. This corresponds very well to a value for $a$ (Cl:Si ratio) of 0.683, which conforms to the value 0.68 determined from the Cl-content.

Example 2

Working in accordance with Example 1, but with the use of 1196 g. (8 mols) methyltrichlorosilane per 74.1 g. (1 mol) t-butanol, a product having the following formula.

---

[1] Of Varian Associates of Palo Alto, Calif.

was obtained. The yield was 59.2 g. that is 78.2% of the theory calculated on t-butanol used. The viscosity of the product was 165 cp. Cryoscopically a mole weight of 1300 was found. In the IR-spectrum a wide band was observed at 1026 cm.$^{-1}$, which corresponds to a stretching vibration of a strained cyclic siloxane. In the NMR-spectrum taken with Varian A 100, 3 peaks were obtained at 9.74$\tau$, 9.45$\tau$ and 9.19$\tau$. The peaks had an area ratio of 106:53:45. Corresponding to the first formula in col 3, the ratio $d:e:f=106:53:45$. This corresponds to a value for $a$ (Cl:Si-ratio) of 0.701, which conforms well to the value 0.71 determined from the Cl-content.

Example 3

In analogy to Example 1, 846.4 g. (4 mols) or 423.2 g. (2 mols) phenyltrichlorosilane were reacted with 74.1 g. (1 mol) t-butanol. In that case the volatile components were distilled off at 210° C. bath temperature and 18 mm. Hg. Obtained were 134.8 g. or 120.5 g., respectively, of siloxanes solid at room temperature, but liquid at 210° C. and soluble in toluene. The analytically determined composition corresponded to the formulas $$\begin{matrix} C_6H_5 \\ | \\ Si-O_{1.06} \\ | \\ Cl_{0.88} \end{matrix} \text{ or } \begin{matrix} C_6H_5 \\ | \\ Si-O_{.20} \\ | \\ Cl_{0.60} \end{matrix}$$

The yields were therefore 93.2 that is 99% of the theory, calculated on t-butanol used.

Example 4

Working in analogy to Example 1, but using 448.5 g. (3 mols) methyltrichlorosilane and 74.1 g. (one mole) t-butanol, a gel-like residue was obtained. When, however 748 g. carbontetrachloride were added during the hydrolysis, a siloxane of the formula

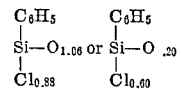

$$\begin{matrix} CH_3-Si-O_{1.235} \\ | \\ Cl_{0.53} \end{matrix}$$

is obtained having a viscosity of 280 cp. and a cryoscopically found mole weight of 650.

Example 5

Into a three-necked flask 598 g. (4 mols) methyltrichlorosilane were introduced and heated until reflux set in. Then 74.1 g. (one mole) t-butanol were added drop by drop, while stirring, within 3 hours, with the reaction product kept boiling under reflux. Subsequently, the product was refluxed for three more hours and then all volatile material distilled off over a distillation device without column at 210° C. bath temperature under normal pressure. The residue—91 g.—corresponded to the formula

$$\begin{matrix} CH_3 \\ | \\ Si-O_{1.00} \\ | \\ Cl_{1.00} \end{matrix}$$

This corresponds to a yield of 96.3% calculated on t-butanol used. The viscosity was 36.0 cp., the molar weight cryoscopically determined was 930. With the formula given the figures found by elementary analysis conformed well.

Theoretically calculated (percent): Si, 29.7; C, 12.7; H, 3.2. Found (percent): Si, 29.3; C, 12.8; H, 3.2.

In the infrared spectrum the Si—O—Si stretching vibration at 1026 cm.$^{-1}$ which corresponds to a strained cyclic siloxane was missing. Also, in the IR-spectrum no bands could be observed which would have indicated the presence of t-C$_4$H$_9$—OSi-groups. In the NMR-spectrum taken with Varian A 100, 3 peaks were obtained at 9.64$\tau$, 9.42$\tau$ and 9.19$\tau$ (peak for tetramethylsilane=10$\tau$) the peaks appeared in the area ratio 3:1:3, corresponding to groupings

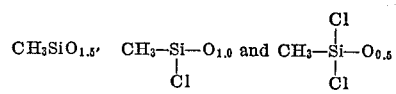

$$CH_3SiO_{1.5'} \quad CH_3-Si-O_{1.0} \text{ and } \begin{matrix} Cl \\ | \\ CH_3-Si-O_{0.5} \\ | \\ Cl \end{matrix}$$

The product therefore has the formula

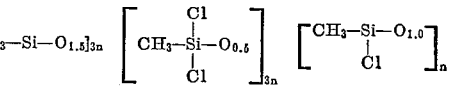

$$[CH_3-Si-O_{1.5}]_{3n} \begin{bmatrix} CH_3-Si-O_{0.5} \\ | \\ Cl \\ | \\ Cl \end{bmatrix}_{3n} \begin{bmatrix} CH_3-Si-O_{1.0} \\ | \\ Cl \end{bmatrix}_n$$

$n=1.406$

The product was distilled at 1 mm. Hg in a falling film evaporator.

The following fractions were obtained:

TABLE I

| Temperature of the evaporator surface | Percent distillate | a-Value or C.=Si ratio in distillate | Mole weight |
|---|---|---|---|
| 100° | 16.8 | 0.99 | 610 |
| 150° | 15.2 | 1.00 | 680 |
| 200° | 17.6 | 1.00 | 970 |
| 250° | 12.6 | 0.99 | 1,164 |
| 300° | 11.6 | 1.00 | 1,300 |

The residue was 26.2%. Its value was 0.87 and the mole weight 4464.

Example 6

In analogy to Example 5, several silanes were hydrolyzed with t-butanol at reflux conditions or 100° C., respectively. The results are tabulated in Table II.

TABLE II

| Silane used | Moles silane per 1 mole t-butanol | Conditions | Composition of product | Viscosity, cp, (20° C) (mole weight) | Yield calc, on t-butanol, percent | Remarks |
|---|---|---|---|---|---|---|
| $CH_3SiCl_3$ | 8 | Reflux | $Cl_{1.01}-\overset{CH_3}{\underset{}{Si}}-O_{0.995}$ | 34.9 (920) | 100 | |
| $CH_3SiCl_3$ | 2 | do | $Cl_{0.99}-\overset{CH_3}{\underset{}{Si}}-O_{1.005}$ | 38.6 (940) | 98 | |
| $CH_3SiCl_3$ | 1.5 | do | $Cl-\overset{CH_3}{\underset{}{Si}}-O$ | Gel | | |
| $CH_3SiCl_3$ | 1.1 | do | $Cl_{0.6}-\overset{CH_3}{\underset{}{Si}}-O_{1.2}$ | 225 (763) | 87.7 | 434 g, CCl$_4$ added per mole t-butanol, |
| $C_6H_5SiCl_3$ | 4 | 100° C | $Cl_{0.99}-\overset{C_6H_5}{\underset{}{Si}}-O_{1.005}$ | (¹) | 96.7 | Distilled at 210° C, bath temperature and 18 mm, Hg, |
| $HSiCl_3$ | 4 | Reflux | $Cl_{1.1}-\overset{H}{\underset{}{Si}}-O_{0.95}$ | 11.7 (790) | 96.5 | H, found, 1,20%; H, calc., 1,21%, |
| $SiCl_4$ | 4 | do | $Cl_{0.99}-\overset{Cl}{\underset{}{Si}}-O_{1.005}$ | 14.7 (880) | 99.8 | Column-distillation, |

¹ At room temperature solid.

What is claimed is:

1. In a process of preparing compounds of the formula $$R-\underset{Cl_a}{Si}-O_{\frac{3-a}{2}}$$

wherein $a=0.5$ to $1.1$ and R is hydrogen, chlorine, alkyl or aryl, by subjecting silanes of the general formula $RSiCl_3$ wherein R has the above meaning, to hydrolysis with tertiary alcohols as hydrolyzing agents, the improvement which comprises first introducing said silanes into a reaction vessel and adding thereto the tertiary alcohol in dropwise manner at temperatures between 10° C. and 150° C. the amount of tertiary alcohol per mole of silane being less than .9 mole and thereafter removing by distillation the unreacted silane together with t-alkylchloride which is formed as a by-product.

2. The improvement according to claim 1, wherein the alkyl or aryl is substituted.

3. The improvement according to claim 1, wherein the hydrolysis is carried out in the presence of an inert solvent which is removed by distillation together with the unreacted silane and the t-alkylchloride.

4. The improvement according to claim 1, wherein the amount of the tertiary alcohol added to the silane is between 0.5 and 0.125 mole per mole of silane.

5. The improvement according to claim 1, wherein the tertiary alcohol used has a chain length of $C_4$ to $C_8$.

6. The improvement according to claim 5, wherein the tertiary alcohol is t-butanol and the silane is $YSiCl_3$, wherein Y is hydrogen, methyl, ethyl, propyl, butyl or phenyl.

7. A liquid or liquefiable compound of the general formula $$R-\underset{Cl_a}{Si}-O_{\frac{3-a}{2}}$$

having a mean mole weight of 600 to 2000, wherein R stands for hydrogen, chlorine, alkyl, aryl, substituted alkyl, or substituted aryl, and $a=0.5$ to $0.9$.

8. A liquid or liquefiable cyclic siloxane of the general formula $$[R-\underset{Cl}{Si}-O_{1.5}]_g[R-\underset{Cl}{Si}-O_{0.5}]_e R-\underset{Cl}{Si}-O_{1.0}]_h$$

having a mean mole weight of 600 to 2000, wherein R stands for hydrogen, chlorine, alkyl, aryl, substituted alkyl, or substituted aryl, and $g$ is greater than $h$, and $g$ and $h$ are greater than zero.

References Cited
UNITED STATES PATENTS

| | | | |
|---|---|---|---|
| 3,432,538 | 12/1969 | Curry | 260—48.2 E |
| 3,484,468 | 12/1969 | Curry | 260—448.2 E |
| 3,101,361 | 8/1963 | Brown et al. | 23—366 |

DELBERT E. GANTZ, Primary Examiner

P. F. SHAVER, Assistant Examiner

U.S. Cl. X.R.

106—13; 260—46.5 R, 448.2 R, 448.2 E